April 20, 1954 J. SACKS 2,675,570
EXTENSIBLE ROTARY PIPE OR CONDUIT CLEANING PORTABLE DEVICE
Filed July 2, 1949 2 Sheets-Sheet 1
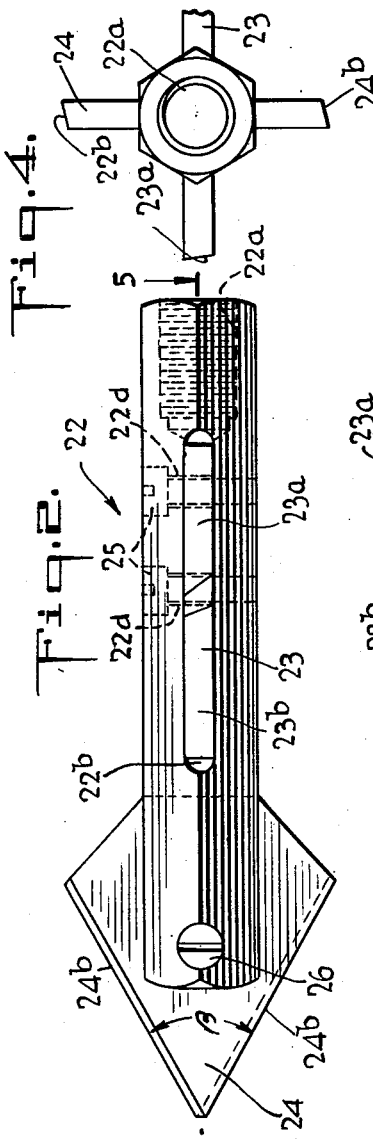
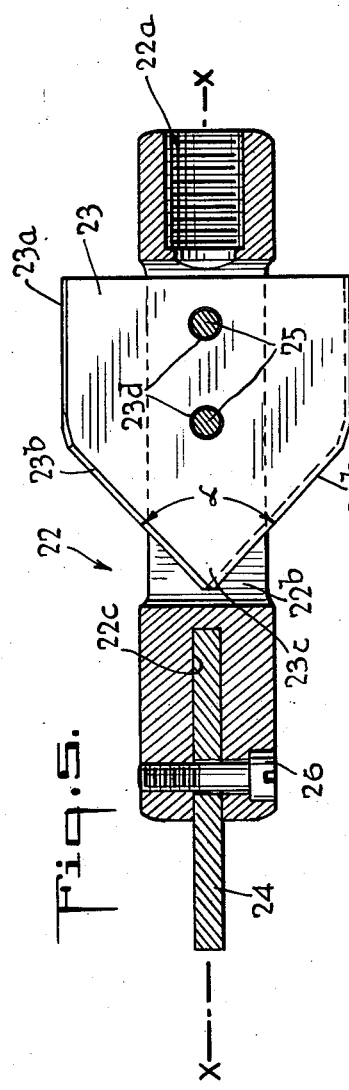
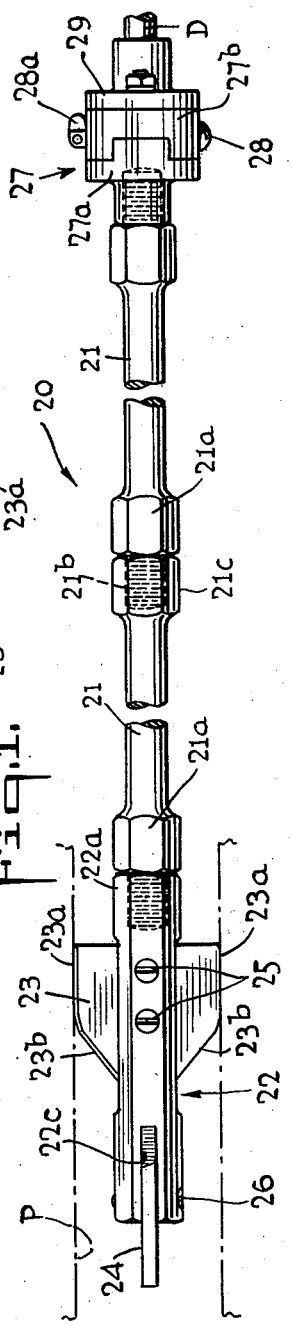
INVENTOR.
JACK SACKS
BY
Erwin M. Barnett
ATTORNEY

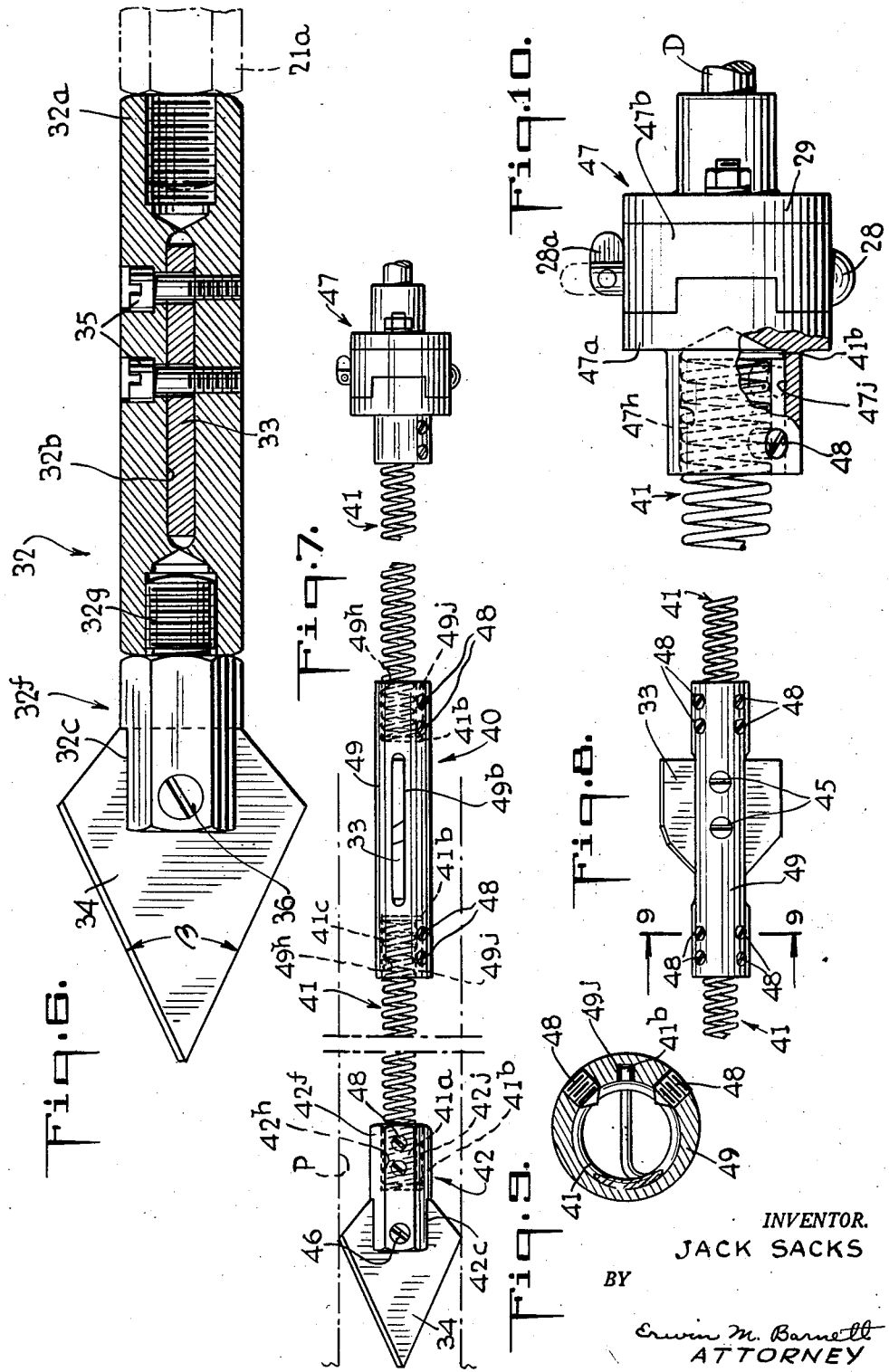

Patented Apr. 20, 1954

2,675,570

UNITED STATES PATENT OFFICE 2,675,570

EXTENSIBLE ROTARY PIPE OR CONDUIT CLEANING PORTABLE DEVICE

Jack Sacks, Brooklyn, N. Y.

Application July 2, 1949, Serial No. 102,873

8 Claims. (Cl. 15—104.10)

This invention relates to extensible rotary pipe or conduit cleaning portable devices having attachable drill-headed reamer for clearing the interior passage through a pipe or conduit to relieve clogging and removal of caked deposits.

Among the objects of the invention is to generally improve rotary devices of the character described which shall comprise few and simple parts that are readily formed into a portable, effectively working extensible assembly, which shall have interchangeable parts suitable for different requirement of service, which shall be cheap to manufacture, which shall be convenient to manipulate by hand through a crank brace or operate by motor power, which shall require a minimum of time and labor to service various lengths and sizes of pipe or conduit interior through-passageways, and which shall be practical and efficient to a high degree in use.

Other objects of this invention will in part be obvious and in part hereinafter pointed out.

The invention accordingly consists of features of construction, combination of elements and arrangement of parts which will be exemplified in constructions hereinafter described and of which the scope of application will be indicated in the claims following.

In the accompanying drawings in which is shown various possible illustrated embodiments of the invention, Fig. 1 is a front elevational view of a portion of an assembled extensible pipe or conduit cleaning device having an attachable drill headed reamer constructed to embody the invention, parts of the extension section rod lengths being broken away, and showing in dot and dash lines fragmentary portions of a pipe or conduit through-passage to be cleared.

Fig. 2 is a top plan view of a pipe or conduit cleaning drill headed reamer fitting dismounted from the assembly shown in Fig. 1.

Figs. 3 and 4 are views of the leading and tail ends, respectively, of the fitting shown in Fig. 2.

Fig. 5 is a cross-sectional view of the drill headed reamer fitting taken on lines 5—5 in Fig. 2.

Fig. 6 is top plan view, partly in section, showing a modified form of pipe and conduit cleaning drill headed reamer fitting formed with a quick demountable drill blade.

Fig. 7 is a top plan view of a modified form of working assembly of an extensible pipe or conduit cleaning device embodying the invention partly broken away showing in said assembly flexible section extensions with connectors thereof.

Fig. 8 is a fragmentary side elevational view showing the connector securing ends of flexible section extensions shown in Fig. 7.

Fig. 9 is a sectional view taken on lines 9—9 in Fig. 8, and

Fig. 10 is a front elevational view of the coupling connector for joining an end of a flexible section extension in an extensible assembly.

Referring in detail to the drawing, 20 denotes a working assembly of an extensible cleaning device constructed to embody the invention for cleaning the interior passageway through a clogged pipe or conduit P and for removal of caked deposits therefrom.

As seen from Figs. 1 to 5, said assembly of device 20 may include a plurality of series connected extension section rods 21, that is, suitably connected in end to end relation and of each of a length so as to be conveniently handled for extending through an obstruction or caked deposit (not shown) in passageway P to be cleared or cleaned. Rods 21 may be tubular or solid and as here shown are metallic, each being formed with an integral hexagonal head 21a terminated with a projecting stud screw 21b at one end and an integral hexagonal head internally screw thread 21c at the other end, stud screw 21b of each rod 21 being machined to fit the screw thread 21c of each of the other rods as is clear from Fig. 1.

The stud screw 21b of a leading end of rod 21 may have mounted thereon an internal screw threaded end 22a of a shank or holder 22 of a drill headed reamer shown in Figs. 2 to 5, said holder 22 being pierced by a closed-ended through-slot 22b disposed to lie in one plane into which a flat reamer cutter 23 extends.

Said shank 22 may terminate with a bifurcated portion to provide an open-ended slot 22c spaced from said slot 22b and disposed to lie in a plane extending in angular relation thereto into which a flat blade drill 24 extends, the latter preferably lying in a plane at right angles to the plane of said reamer cutter 23 and intersecting on axis line X—X passing longitudinally through shank 22, as shown in Fig. 5.

In order that the reamer cutter 23 and blade drill 24 may be interchanged to accommodate the requirements of various services, the thickness of each may be substantially made the same, that is, to neatly fit into either of the slots 22b or 22c, and closed-ended slot 22b being of a length so that either said reamer 23 or drill 24 may be accommodated as is clear from Figs 2 and 5.

For securing cutter 23 and drill 24 in aligned effective position by holder 22, suitable fastening means may be provided, as for example, spaced apart clamp screws 25 for reamer cutter 23 and a similar screw 26 for the blade drill 24. The screws 25 and 26, respectively, may be threaded into tapped holes 22d and 22e of holder 22, respectively, so as to firmly clamp said cutter 23 and drill 24 between the respective wall portions of slots 22b and 22c.

As seen from Figs. 2 to 5, reamer cutter 23 may have parallelly aligning scraping and guide bearing edge sides 23a and tapering cutting side edges 23b disposed at angle α which terminate in a pointed end 23c, and as shown in Fig. 5, said cutter 23 may also be provided with suitable through-openings 23d spaced apart for permitting passage of clamping screws 25.

As shown in Fig. 2, blade drill 24 may be made with tapering cutting edges 24b which for some services can have said edges 24b disposed at an angle β more acute than angle α of cutter 23, the effective boring width of drill 24 may be substantially equal to the effective cutting width of cutter 23, the latter construction serving as bearing and guiding means for centralizing the device 20 with relation to an axis of passageway P being cleared.

Holder 22 may be made of metal stock having a hexagonal cross-section to facilitate tightening screw interconnection between head 21a and holder 22 with the aid of a conventional wrench in the well understood manner.

In order that various assembled lengths of interconnected rods 21 may be quickly detached without individually or group screw disconnecting same, there may be provided separable coupling 27 comprising male and female parts 27a and 27b, respectively, held in mating position by retaining bolt 28, male part 27a connecting one portion of the assembly to female part 27b of another portion of the assembly or a suitable motor or manual drive D including bolted fitting 29 as is clear from Fig. 1. The specific construction of coupling 27, retaining bolt 28 and screw fitting 29 may be like that fully described, and claimed in applicant's co-pending application Serial No. 102, 874, filed July 2, 1949, now Patent No. 2,617,673.

Coupling 27 and projecting parts of retaining bolt 28 in the assembly may serve as radial aligning centralizing bearing means for device 20 when in effective operation.

The operation of device 20 will now be apparent. After constructing the various parts described above and shown in Figs. 1 to 5, said drill headed reamer may be assembled as a unit by securing reamer cutter 23 in slot 22b of holder 22 by screws 25, and securing blade drill 24 in shank open slot 22c by screw 26. Said drill headed reamer unit may then be inserted in a pipe or conduit P which is to be cleaned or cleared and rotated by hand through a cranking brace or motor power applied to holder end 22a.

As said drill headed reamer unit is advanced into said pipe P, rods 21 are successively screwed thereon in series assembly, and where the clearing of said pipe P requires a great many rods 21 one or more couplings 27 may be interposed in the assembly so as to sectionalize same for quick and easy assembly and dismounting, the separation of the assembly into sections being accomplished simply by withdrawing retaining bolt 28 from its effective locking position shown in Fig. 1 to permit separation between male and female portions 27a and 27b.

A snap latch 28a may be provided at the free end of retaining bolt 28 to releasably hold the latter from being moved from the effect holding position.

Where coupling 27 terminates the end of the device 20 as shown in Fig. 1, bolted fitting 29, which connects with a suitable manual or power drive D of any conventional construction for rotating device 20, is used.

Thus when pressure and rotating power is applied at drive D flat blade drill 24 first pierces and cuts any obstruction in pipe P after which flat reamer cutter 23 severs and cleans out the clogging material.

The coupling 27 may also be used in an assembly for radially centralizing a midportion thereof by using male and female parts retained by said bolt 28 as a supporting bearing as is clear from Fig. 7, and hereinafter more fully described.

Instead of making shank or holder 22 from a single piece of stock material as in device 20, drill reamer unit may also be made as a two-part construction as shown in Fig. 6 in which an end of shank 32 which supports a blade drill 34 has a finial type attachment 32f screw-connected, as at 32g, to the main shank or holder portion 32, the latter being provided with a closed-ended through slot 32b in the identical manner as described above for closed-ended slot 22b of shank 22. Cutter reamer 33 is retained in said slot 32b of shank portion 32 by spaced tap screws 35, tap screw 36 being provided to retain blade drill 34 in an open-ended slot 32c of attachment 32f. Said shank portion 32 is threaded at end 32a opposite blade drill 34 for receiving stud screw 21b of a rod 21. Blade drill 34 may be of the same construction as blade drill 24 having tapered cutting edges disposed at angle β.

The above described modified form of the drill headed reamer unit may be used in same manner and in the assembly of device 20 as shown in Fig. 1. However, said construction shown in Fig. 6 permits quicker and easier interchanging of drill blades or the removal thereof for repairs or sharpening when required with less complicated dismantling of parts by simply unscrewing the blade with attachment 32f at the screw connection 32g. Thus drill blades can be conveniently replaced or interchanged to suit various requirements of the pipe cleaning or clearing operations.

When said pipe or conduit P has an uneven or distorted through-passageway, it is contemplated to modify the invention in the manner shown in Figs. 7 to 10 by providing one or more helically wound or coiled lengths of wire, each forming a flexible member 41 for use in replacing the more rigid structure of rods 21 in assembly of device 40.

The latter may comprise an assembly of shank 42 which has a terminal open ended slot 42c in which blade drill 34 is secured by tap screw 46, end 42f opposite said slot 42c being bored as at 42h to receive end 41a of helical wound flexible member 41. As shown in Figs. 7, 8 and 9, said end bore 42h may be broached along the length thereof to provide a groove 42j into which end stub 41b, extending to outstand beyond the coil surface of flexible member 41, is seated to practically prevent relative rotation between said flexible member end 41a in shank end bore 42h. To positively secure said end 41a in bore 42h for detachably connecting the shank 42 to flexible member 41, one or more pairs of suitable fastening means, such as set screws 48 may be provided in spaced apart relation to clamp and firmly grip said end 41a in bore 42h against movement from being disconnected as is clear from Fig. 9.

Flexible member 41 may have end 41c thereof oppose said end 41a joined in the assembly through connector fitting 49 which has each opposite ends thereof bored as at 49h and provided with a groove 49j to be detachably secured in alignment by pairs of set screws 48 in the manner similar to and for the same purpose as described above for shank 42 connection to said flexible member end 41a and shown in Figs. 7 and 8.

Connection fitting 49, may if desired be constructed to connect with the end of lengths of rods like 21 but as here shown in the assembly 40 connects with an end of another length of flexible member 41 which along the assembly has interposed a suitable coupling 47 like coupling 27 described above for device 20, said coupling 47 being manually or power rotary driven by a suitable hand cranking tool or motor D, respectively.

Coupling 47, as seen in Fig. 10, has female portion 47b, similar to female portion 27b of coupling 27, above described, and a male portion 47a formed with an axial bore 47h for receiving an end of helically wound flexible member 41, said bore 47h being broached with groove 47j into which end stub 41b is fitted and retained against separation from the assembled position by set screws 48.

Connection fitting 49 may be pierced with an elongated closed-ended through-slot 49b into which cutter reamer 33 is fitted and retained securely in aligned position by tap screws 45.

Assembly device 40 may be used in part as a section or sections of device 20 as required or may be made up entirely of flexible members 41 interconnected by fittings 49 and one or more couplings 47, in the same manner as described above for device 20 and for same purposes.

It will thus be seen that there is provided extensible rotary pipe or conduit cleaning portable devices in which the various objects of this invention are achieved and which is well adapted to meet conditions of practical and efficient use.

As various possible embodiments might be made of the above invention, and as changes might be made in the embodiments above set forth, it is to be understood that all matters herein set forth or shown in the accompanying drawings is to be interpreted as illustrative and not in a limiting sense.

Having thus described my invention I claim as new and desire to secure by Letters Patent:

1. In an extensible rotary portable device of the character described, a drill-headed reamer comprising an elongated holder pierced through a midportion thereof to provide a closed-ended slot and having a bifurcated leading end forming an open-ended slot spaced from said closed-ended slot and disposed in angular relation thereto, a flat boring pointed blade drill removably secured in said open-ended slot, a one-piece flat reamer cutter removably fitted in said closed-ended slot, screw fastening means passing through a midportion of said reamer cutter and the rotary axis of the holder for retaining the reamer cutter in said closed ended slot, said reamer cutter having parallel spaced edges to serve as bearing and guiding means for radially centralizing the drill-headed reamer lengthwise in an axial alignment and forward tapering cutting edges, and means integrally formed with the end of said holder opposite said leading end for detachably connecting with an end of an extension member in said axial alignment.

2. In an extensible rotary portable device of the character described, a drill-headed reamer as defined in claim 1 in which said holder is formed of two separable parts connected together between said blade drill and reamer cutter to permit removal and replacement of the blade drill with one of said holder parts.

3. In an extensible rotary portable device of the character described, a drill-headed reamer as defined in claim 1 in which said holder has an integrally formed sleeve fitted end portion opposite said bifurcated leading end constructed and arranged for detachably connecting with an end of a flexible helically coiled wire section member in said axial alignment.

4. In an extensible rotary portable device of the character described, a connector fitting for interconnecting ends of flexible helically wound wire section members in an end to end relation, each member having projecting end stubs extending to outstand beyond coil surfaces of said members, said connector fitting having end bores forming sleeves, each bore being broached to provide grooves along the length thereof into which one of said end stubs extends to prevent relative rotation of the member fitted into the bore, and screw fastening means carried by said connector fitting for clamping said section member ends in said sleeves against disconnecting longitudinal movement.

5. In an extensible rotary portable device of the character described, a connector fitting for interconnecting ends of flexible helically wound wire section members having projecting end stubs extending to outstand beyond coil surfaces of said members, said connector fitting having end bores forming sleeves broached to provide grooves along the length of the bores into which one of said end stubs extends to prevent relative rotation therebetween, set screw fastening means carried by said connector fitting threaded to engage said section member ends for clamping the latter in said sleeves against disconnecting movement, said connector fitting formed of elongated stock material pierced through at a midportion thereof to provide a closed-ended slot, and a flat reamer cutter secured in said slot in an axial alignment with said elongated fitting.

6. An extensible rotary portable device assembled to comprise a plurality of extension section members series connected in end to end relation, a drill-headed reamer demountably carried to terminate a free end of said series connected members, the other end of said series connected members having a detachable power drive connection fitting, said drill-headed reamer having an elongated holder pierced through a mid-portion thereof to provide a closed-ended slot and having a bifurcated leading end forming an open-ended slot spaced from said closed-ended slot and disposed in angular relation thereto, a flat boring pointed blade drill releasably secured in said open-ended slot, a flat reamer cutter releasably fitted in said closed-ended slot, screw fastening means passing through a midportion of said reamer cutter and the rotary axis of the holder for retaining the reamer cutter in said closed-ended slot, and said reamer cutter being substantially equal in effective cutting width to the effective boring width of said drill, and having parallel spaced edges to serve as bearing and guiding means for radially centralizing the drill-headed reamer lengthwise in an axial alignment, and means integrally formed with the end of said holder opposite said leading end for detachable connection with an end of an extension member in said axial alignment.

7. An extensible rotary portable device assembled as defined in claim 6 in which at least one of said extension section members is of flexible helically coiled wire construction to permit said assembly to conform with variations and irregularities in the passageway to be cleared, each flexible member having projecting end stubs extending to outstand beyond coil surfaces thereof, a detachable connection sleeve fitting for connecting ends of said flexible section member into alignment with other extension section members and said holder, said sleeve fitting having end bores broached to provide grooves along the length thereof into which said end stub extends to prevent relative rotation of the member fitted into the bore, and fastening means carried by said fittings for clamping said flexible member stubs in said grooves against disconnecting movement.

8. An extensible rotary portable device assembled to comprise a plurality of extension section members series connected in end to end relation, a drill-headed reamer demountably carried to terminate a free end of said series connected members, the other end of said series connected members having a detachable power drive connection fitting, said drill-headed reamer having an elongated holder pierced through a midportion thereof to provide a closed-ended slot and having a bifurcated leading end forming an open-ended slot spaced from said closed-ended slot and disposed in angular relation thereto, a flat boring pointed blade drill releasably secured in said open-ended slot, a flat reamer cutter releasably retained in said closed-ended slot, said reamer cuttter being substantially equal in effective cutting width to the effective boring width of said drill, said reamer serving as bearing and guiding means for radially centralizing said device lengthwise with relation to an axis of a passageway being cleared, said extension section members being of flexible helically coiled wire construction to permit said assembly to conform with variations and irregularities in the passageway to be cleared, detachable connection sleeve fittings for connecting ends of said flexible section members into alignment with each other, said flexible helically wound wire section members having projecting end stubs extending to outstand beyond coil surfaces of said members, each of said connector fittings and the end of said holder opposite the drill having end bores forming sleeves broached to provide grooves along the length of the bores into which said stub end extends to prevent relative rotation therebetween, and set screw fastening means carried by said fitting and holder end threaded to engage said section member ends for retaining the latter in said sleeves against disconnecting axial movement.

References Cited in the file of this patent
UNITED STATES PATENTS

| Number | Name | Date |
|---|---|---|
| 586,665 | Hull | July 20, 1897 |
| 878,145 | Middleton | Feb. 4, 1908 |
| 1,275,437 | Jillson | Aug. 13, 1918 |
| 1,355,726 | Zlatnik | Oct. 12, 1920 |
| 1,429,146 | Karge | Sept. 12, 7922 |
| 1,642,345 | Telford | Sept. 13, 1927 |
| 1,861,532 | Hough | June 7, 1932 |
| 1,937,742 | Brink | Dec. 5, 1933 |
| 2,158,577 | Haley | May 16, 1939 |
| 2,201,733 | Kollmann | May 21, 1940 |
| 2,278,324 | Kollmann | Mar. 31, 1942 |
| 2,339,488 | Kratoville | Jan. 18, 1944 |
| 2,348,100 | Wadsworth | May 2, 1944 |